Sept. 19, 1939.  C. M. HAMBLIN  2,173,109

PROCESS FOR WELDING PIPE JOINTS

Filed Feb. 8, 1938

C. M. HAMBLIN
INVENTOR

BY
*Ransom K. Davis*
ATTORNEY

Patented Sept. 19, 1939

2,173,109

UNITED STATES PATENT OFFICE 2,173,109

PROCESS FOR WELDING PIPE JOINTS

Clyde M. Hamblin, Washington, D. C.

Application February 8, 1938, Serial No. 189,326

3 Claims. (Cl. 113—112)

(Granted under the act of March 3, 1883, as amended April 30, 1928; 370 O. G. 757)

This invention relates to the design of dams or stops for welding joints in pipe or tubing.

It is a principal object of this invention to provide means to be placed inside the ends of pipes or tubes when they are to be joined by welding, which will prevent the weld metal from burning through and forming "Icicles" projecting inside the pipe or tube.

A further object is to provide a resistant material which can be used in the ends of pipes or tubes which are to be joined by welding, without expanding the pores or tubes and can be removed after the weld is completed, leaving the interior of the pipe or tube at the weld of equal cross-sectional area to the remainder of the pipe or tube.

In accomplishing these and other objects, there are provided the improved details of construction, the preferred forms of which are illustrated in the accompanying drawing, wherein, Fig. 1 is an end view of a collapsible welding dam taken on line 1—1 of Fig. 3;

Figures 1, 2:
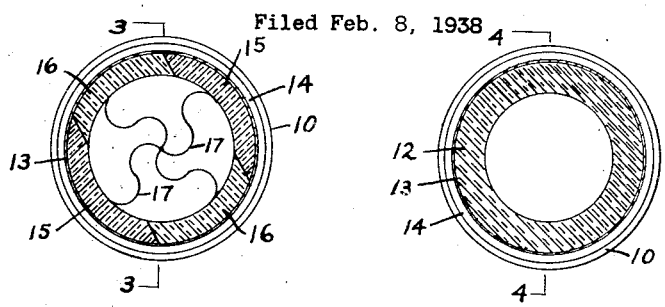
Fig. 2 is an end view of a rigid welding dam taken on line 2—2 of Fig. 4.

There is shown at 10 the ends of two pieces of pipe or tube which are to be joined by welding. The ends may be beveled as at 11. A welding dam or stop 12 consisting of a circular ring or cylinder or non-metallic, fire resistant and heat resistant material such as magnesia block which will soften or disintegrate in water, or of material such as diatomaceous silica or a baked sand core which will crush easily, fitting closely the inside of the pipe or tubes 10, is forced for half its length into the end of one of the pieces of pipe or tube. The other piece of pipe or tube is then forced over the other end of welding dam 12 until the ends of the two pieces of pipe or tube butt at approximately the center of the welding dam 12.

Where galvanized pipe or tube is to be welded, zinc foil or sheet may be wrapped around welding dam 12 to form a zinc sleeve 13 before inserting the welding dam in the ends of the pipe or tube. When the welding arc or flame heats the ends of the pipes or tubes 10 to a sufficient temperature to destroy the coat or galvanizing on the inside of the pipe or tube the zinc sleeve 13 will melt where it is in contact with the hot metal of the pipe or tube and with the hot weld metal. As the metal cools the melted portion of the zinc sleeve will form a new coat of galvanizing on the interior of the ends of the pipes or tubes and the weld.

It is likewise obvious that the dam with the zinc sleeve may be used on a non-galvanized pipe and thereby galvanize the weld and the pipe in the area of the joint.

For convenience in centering the welding dam 12 in the ends of the pipes or tubes, a wire or ring 14 of ferrous metal may be molded in or clamped around the center of the welding dam. Where a zinc sleeve is used on the welding dam the metal wire or ring is clamped on the outside of the zinc sleeve. If welding dams of material which will disintegrate in water are used the pipe is filled with water after the welds are completed until the welding dams disintegrate and mix with the water. The pipe lines are then flushed out to clean them. If the welding dams are of fragile material, some form of pipe cleaner is forced through the pipe, after the welds are completed, to crush the dams.

Figure 3:
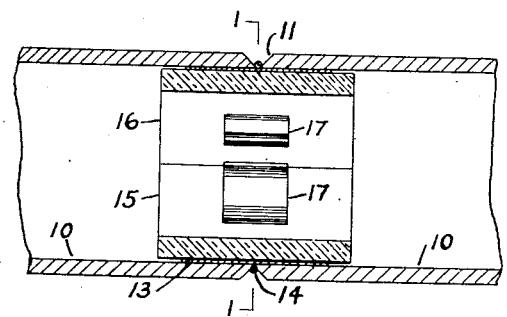
Fig. 3 is a longitudinal sectional view of a collapsible welding dam taken on line 3—3 of Fig. 1.
Figure 4:
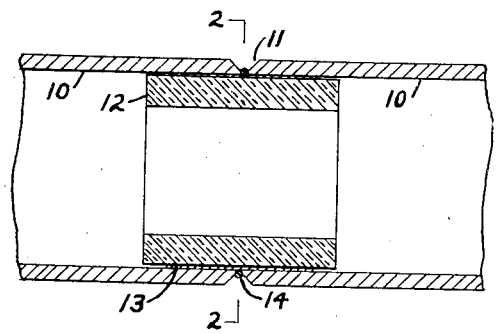
Fig. 4 is a longitudinal sectional view of a rigid welding dam taken on line 4—4 of Fig. 2.

In the alternate arrangement shown in Fig. 1 and Fig. 3, the pipes or tubes 10 with bevel 11, sleeve 13 and ring 14 are similar to those described for Fig. 2 and Fig. 4. In this arrangement the welding dam is made up in multiple sections, as at 15 and 16. These sections are attached to springs 17 which hold the welding dam in the expanded position against the interior of the pipe or tube. In this arrangement also the zinc sleeve may be in sections to permit expansion after the welding dam is inserted in the ends of the pipes or tubes and the centering ring or wire is open ended to permit expansion. After the weld is completed the welding dam can be forced out of the pipe.

Mechanical means for expanding and contracting the collapsible type of welding dam by hand may be substituted for the springs, if desired.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. The process of joining pipes autogenously comprising assembling the pipes to be joined in their intended relative position with a non-fusible plug having a zinc sleeve extending into each for a distance from the point of joining and in contact throughout its circumference and length with the walls, autogenously welding the pipes together whereby a flow of melted material into the interior of the pipes during welding is prevented and the zinc sleeve is melted to galvanize the welded surface, and removing the plug after the weld is made by forcing a means through the pipes that will disintegrate the plug.

2. The process of joining pipes autogenously, comprising scarfing the ends of two pipes to be joined, assembling them in their intended relative position, forming a non-fusible plug with a zinc sleeve of an external diameter substantially equal to the internal diameter of the pipes and with a slight circumferential ring of fusible material, inserting the plug in the pipes so that the ring is opposite the line of contact of the ends, and autogenously welding the ends of the pipes, thereby melting the zinc sleeves to galvanize the welded surface.

3. The process of joining pipes autogenously comprising assembling the pipes to be joined in their intended relative position with a non-fusible plug having a zinc sleeve extending into each for a distance from the point of joining and in contact throughout its circumference and length with the walls, autogenously welding the pipes together whereby a flow of melted material into the interior of the pipes during welding is prevented and the zinc sleeve is melted to galvanize the welded surface, and removing the plug after the weld is made by forcing a fluid through the pipes that will disintegrate the plug.

CLYDE M. HAMBLIN.